(12) United States Patent
Sage et al.

(10) Patent No.: US 6,251,301 B1
(45) Date of Patent: *Jun. 26, 2001

(54) FERROELECTRIC LIQUID CRYSTAL DEVICES

(75) Inventors: Ian C. Sage; Damien G. McDonnell; John C. Jones; Andrew Slaney, all of Malvern (GB)

(73) Assignee: The Secretary of State for Defence in Her Brittanic Majesty's Government of the United Kingdom of Great Britian and Northern Ireland, Hampshire (GB)

( * ) Notice: Subject to any disclaimer, the term of this patent is extended or adjusted under 35 U.S.C. 154(b) by 4 days.

This patent is subject to a terminal disclaimer.

(21) Appl. No.: 09/149,449

(22) Filed: Sep. 9, 1998

Related U.S. Application Data

(63) Continuation of application No. 08/656,303, filed on Jun. 18, 1996, now Pat. No. 5,820,786.

(30) Foreign Application Priority Data

Dec. 13, 1993 (GB) .................................................. 9325438
Dec. 9, 1994 (WO) ................................. PCT/GB94/02693

(51) Int. Cl.$^7$ .......................... C09K 19/06; C09K 19/30; C09K 19/00; C09K 19/12; C09K 19/34
(52) U.S. Cl. .................................. 252/299.6; 252/299.63; 252/299.66; 252/299.61; 252/299.67; 252/299.68; 428/1.1
(58) Field of Search .......................... 252/299.63, 299.66, 252/299.61, 299.6, 299.67, 299.68; 428/1.1

(56) References Cited

U.S. PATENT DOCUMENTS

| | | | |
|---|---|---|---|
| 4,576,732 | 3/1986 | Isogai et al. | 252/299.65 |
| 4,723,005 | 2/1988 | Huynh-Ba et al. | 544/238 |
| 4,777,280 | 10/1988 | Eldman et al. | 558/389 |
| 4,871,469 | 10/1989 | Reiffenrath et al. | 252/299.61 |
| 4,871,472 | 10/1989 | Krause et al. | 252/299.65 |
| 5,099,344 | 3/1992 | Tsuboyama et al. | 359/79 |
| 5,116,527 | 5/1992 | Coates et al. | 252/299.61 |
| 5,133,896 | 7/1992 | Coates et al. | 252/299.65 |
| 5,147,577 | 9/1992 | Gray et al. | 252/299.63 |
| 5,384,071 | 1/1995 | Gray et al. | 252/299.63 |
| 5,456,859 | 10/1995 | Gray et al. | 252/299.63 |
| 5,486,309 | 1/1996 | Gray et al. | 252/299.6 |
| 5,501,818 | 3/1996 | Shinjo et al. | 252/299.61 |
| 5,512,208 | 4/1996 | Terada et al. | 252/299.6 |
| 5,514,297 | 5/1996 | Shinjo et al. | 252/299.61 |
| 5,599,479 | 2/1997 | Shinjo et al. | 252/299.63 |
| 5,611,957 | 3/1997 | McDonnell et al. | 252/299.01 |
| 5,820,786 | * 10/1998 | Sage et al. | 252/299.66 |

FOREIGN PATENT DOCUMENTS

| | | |
|---|---|---|
| 316011 | 5/1989 | (EP) . |
| 61-243055 | 10/1986 | (JP) . |
| 3 119449 | 5/1988 | (JP) . |

* cited by examiner

Primary Examiner—C. H. Kelly
(74) Attorney, Agent, or Firm—Nixon & Vanderhye

(57) ABSTRACT

Ferroelectric liquid crystal devices having two spaced cell walls each bearing electrode structures and treated on at least one facing surface with an alignment layer, and a layer of a smectic liquid crystal material enclosed between the cell walls, exhibits a minimum in its response time versus voltage curve. The crystal material has two components, A and B.

11 Claims, 3 Drawing Sheets

FERROELECTRIC LIQUID CRYSTAL DEVICES

This application is a continuation-in-part of prior applications Ser. No. 08/656,303 filed Jun. 18, 1996, now U.S. Pat. No. 5,820,786.

This invention relates to ferroelectric liquid crystal devices and ferroelectric liquid crystal mixtures.

Liquid crystal devices commonly comprise a thin layer of a liquid crystal material contained between two glass slides. Optically transparent electrodes are formed on the inner surface of both slides. When an electric voltage is applied to these electrodes the resulting electric field changes the molecular alignment of the liquid crystal molecules. The changes in molecular alignment are readily observable and form the basis for many types of liquid crystal device.

In ferroelectric liquid crystal devices the molecules switch between different alignment directions depending on the polarity of an applied electric field. These devices often exhibit bistability where the molecules tend to remain in one of two states until switched to the other switched state. This allows the multiplex addressing of quite large and complex devices.

One common multiplex display has display elements, ie pixels, arranged in an x, y matrix format for the display of eg, alpha numeric characters. The matrix format is provided by forming the electrodes on one slide as a series of column electrodes, and the electrodes on the other slide as a series of row electrodes. The intersections between each column and row form addressable elements or pixels. Other matrix layouts are known, eg seven bar numeric displays.

There are many different multiplex addressing schemes. A common feature involves the application of a voltage, called a strobe voltage to each row or line in sequence. Coincidentally with the strobe applied at each row, appropriate voltages, called data voltages, are applied to all column electrodes. The differences between the different schemes lies in the shape of the strobe and data voltage waveforms.

Other addressing schemes are described in GB-2,146,473-A; GB-2,173,336-A; GB-2,173,337-A; GB-2,173,629-A; WO 89/05025; Harada et al 1985 S.I.D. Paper 8.4 pp 131–134; Lagerwall et al 1985 I.D.R.C pp 213–221 and P Maltese et al in Proc 1988 IDRC p 90–101 Fast Addressing for Ferro Electric LC Display Panels.

The material may be switched between its two states by two strobe pulses of opposite sign, in conjunction with a data waveform. Alternatively, a blanking pulse may be used to switch the material into one of its states. Periodically the sign of the blanking and the strobe pulses may be alternated to maintain a net d.c. value.

These blanking pulses are normally greater in amplitude and length of application than the strobe pulses so that the material switches irrespective of which, of the two data waveforms is applied to any one intersection. Blanking pulses may be applied on a line by line basis ahead of the strobe, or the whole display may be blanked at one time, or a group of lines may be simultaneously blanked.

It is well known in the field of ferroelectric liquid crystal device technology that in order to achieve the highest performance from devices, it is important to use mixtures of compounds which give materials possessing the most suitable ferroelectric smectic characteristics for particular types of device.

Devices can be assessed for speed by consideration of the response time vs pulse voltage curve. This relationship may show a minimum in the switching time ($t_{min}$) at a particular applied voltage ($V_{min}$). At voltages higher or lower than $V_{min}$ the switching time is longer than $t_{min}$. It is well understood that devices having such a minimum in their response time vs voltage curve can be multiplex driven at high duty ratio with higher contrast than other ferroelectric liquid crystal devices. It is preferred that the said minimum in the response time vs voltage curve should occur at low applied voltage and at short pulse length respectively to allow the device to be driven using a low voltage source and fast frame address refresh rate.

Typical known materials (where materials are a mixture of compounds having suitable liquid crystal characteristics) which do not allow such a minimum when included in a ferroelectric device include the commercially available materials known as SCE13 and ZLI-3654 (both supplied by Merck UK Ltd, Poole, Dorset). A device which does show such a minimum may be constructed according to PCT GB 88/01004 and utilising materials such as eg commercially available SCE8 (Merck UK Ltd.). Other examples of prior art materials are exemplified by PCT/GB/86/00040, PCT/GB87/00441 and UK 2232416B.

It is the aim of this invention to provide devices having a shorter switching time and/or a lower voltage than previously achieved.

According to this invention a ferroelectric liquid crystal device (eg multiplex addressed) comprises two spaced cell walls each bearing electrode structures and treated on at least one facing surface with an alignment layer, a layer of a smectic liquid crystal material enclosed between the cell walls, a minimum in its response time versus voltage curve, characterised in that the liquid crystal material consists essentially of two components; A and B, where the two components are given by:

Component A being present in the range of 0.1–50 wt % and is one or more optically active compounds capable of imparting a spontaneous polarisation to the material and is given by the following general formula:

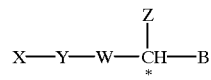

in which X is a group having a general structure:

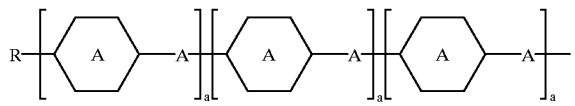

and B is alkyl containing 1–12 carbons, a chiral group, or a group having a general structure:

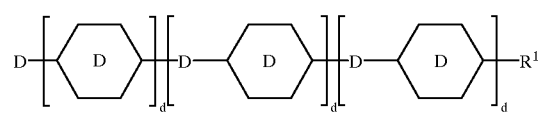

where R and $R^1$ are independently hydrogen or $C_{1-12}$ alkyl, alkoxy, alkylcarbonyloxy or alkoxycarbonyl, each of the rings (A) and (D) may be the same or different and are each independently selected from optionally alkyl-, cyano- or halogen-substituted phenyl, transcyclohexyl, pyridyl, pyrimidyl, bicyclo (2,2,2) octyl or dioxan each A and D may be the same or different and is independently selected from a single bond, COCO, OOC, CH=N, N=CH, CH$_2$O, OCH$_2$, CH$_2$, CH$_2$CH$_2$, CH(CH$_3$) or a combination of two of such groups, in which each a and d is independently 0 and 1, in which Y is selected from —COO—, —OOC—, —O— or a single bond, in which W is selected from a single bond, —(—CH$_2$—)—$_n$ or —(CH$_2$)$_m$CH(Z$^1$)— —(CH$_2$)$_p$— where n, m and p are independently 0 to 10; in which Z or Z' are independently selected from CN, Cl, F, Br and CF$_3$; provided that when Z is Cl or CN, then when B is alkyl, X—Y— is not

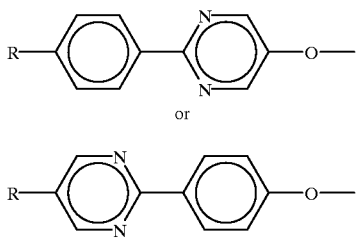

Compounds of formula I in which the unit —YWCH(Z) is COOCH(CN) may be prepared for example by a number of widely applicable routes 1–5 shown schematically in FIGS. 1–5. Compounds of formula I in which —YWCH (CN) is —OCH(CN) may be prepared for example by route 6 shown in FIG. 6.

In routes 1–6 the group B is in some cases introduced into the compound of formula I using an alpha-hydroxy carboxylic acid of formula:

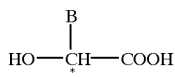

or an alpha-amino acid of formula:

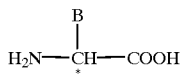

Routes 1–6 are of general suitability but are particularly suited to cases where B is alkyl, phenyl or cyclohexyl.

Some of these acids are commercially available in an optionally pure enantiomeric form, eg the hydroxy carboxylic acids lactic acid (B=CH$_3$) and mandelic acid (B=phenyl), and the series of commercially available or naturally occurring amino acids, eg alanie, valine, leucine, isoleucine, butyrine, alloisoleucine, norvaline, norleucine and phenylalanine—As many such acids are of biochemical origin, they are often available in optically pure forms of one or more enantioners or antipodes, thus yielding optically pure products, whilst at the same time being relatively cheap. The use of these acids where possible is therefore preferred.

Alternatively these acids may be synthesised, to lead to a wider range of B— groups. The alpha-hydroxy acids may in fact be prepared from the corresponding amino acids by reaction of the amino acid with nitrous acid at low temperatures:

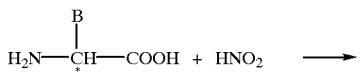

-continued

(eg "Tetrahedron" (1979), 35, 1603 and J.A.C.S (1956) 78, 2428).

Other methods of preparation of alpha-hydroxy carboxylic acids are well known, for example as described in "Chemistry of Carbon Compounds" ed D H Dodd (pvb Elsevier) (1952), IB, p 780–781 (Ref 1) which lists 11 methods of preparation, including those where B may be straight chain, branched chain or optically active alkyl.

Similarly the amino acids having an appropriate B group may be synthesised be general well known methods, for example as described in Ref 1 p 813–817, where 13 methods for the synthesis of a wide range of amino acids is described, including those where B is straight chain, branched chain or optically active alkyl.

Preparation of a suitable alpha hydroxy or amino acid should therefore present no difficulty to the competent chemist. Where these preparation methods result in racemic mixtures of the optical enantiomers or antipodes they may be resolved by known methods, eg the use of brucine or steroespecific enzymic reactions.

When the amino acid used to prepare the alpha-hydroxy acid or used directly eg in route 4 contains functional groups in its side chain B, these may be used to vary the structure of the group 3.

For example serine, threonine and tyrosine contain —OH groups in their side chain, which enables the introduction of ester or ether linkages. Aspartic and glutamic acid contain —COOH groups in their side chain which also enable ester or other linkages to be introduced.

Examples of the types of unit which can be introduced into a compound of formula I using amino acids with functional groups in the side chain include:

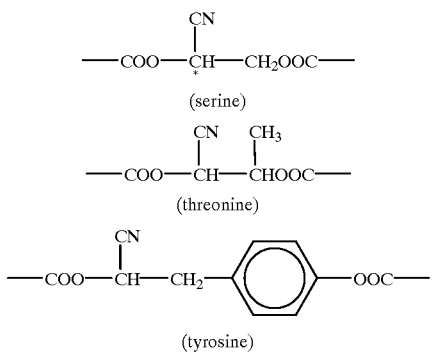

Similarly where routes 1–6 below require the use of a carboxylic acid of general structure R—X—CO$_2$H (where X is as defined in formula I), many of these are commercially available or else may be synthesised by well known general methods for example hydrolysis of the corresponding cyano compounds R—X—CN.

The individual steps of routes 1–6 are identified below.

Route 1

The steps are identified below:

(1)
(i) 20% aqueous Cs$_2$CO$_3$ or K$_2$CO$_3$, methanol-water (9:1) pH 7.0.

(ii) PhCH$_2$Br, DMF.
(2) N,N-dicyclohexylcarbodiimide (DCC), 4-(N-pyrolidino)pyridine (N—PPy), CH$_2$Cl$_2$.
(3) 5% Pd/C, hydrogen, ethanol.
(4)
  (i) oxalyl chloride, benzene, dimethylformanide (DMF).
  (ii) aqueous ammonia, diglyme.
(5) SOCl$_2$, DMF.

Although it is illustrated for use with 4-alkyl- or alkoxy-biphenyl-4'-carboxylic acid, Route 1 is generally suitable for all acids of formula R—X—CO$_2$H and particularly suitable for those groups X which contain rings

linked by single bond. By the use of lactic acid in step (1) B is caused to be methyl, but other homologous alpha-hydroxy carboxylic acids may be used to cause B to be other alkyl groups. By the use of mandelic acid, ie

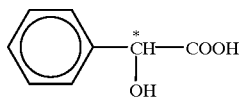

B may be caused to be phenyl.

Route 2

(1)

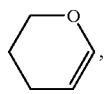

ethyl acetate, hydrogen chloride.
(2) KOH, ethanol, water
(3) similar to Route 1 steps (1) and (2)
(4) oxalic acid, 90% aqueous ethanol
(5) similar to Route 1 step (2)
(6) a series of steps analogous to route 1 steps (3)–(5)

As with route 1, this route is generally applicable to compounds of formula I where one of the groups A in X is COO. By using other alpha-hydroxy acids, different groups B may be introduced into the molecule, as discussed above.

Route 3

(1) hydrogen, 5% Rh/Al$_2$O$_3$, methanol
(2) as route 1 step (1) using methanol solvent.
(3)

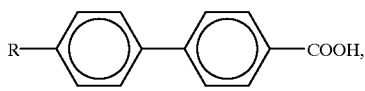

DCC, N—PPy, CH$_2$Cl$_2$ (R=alkyl or alkoxy)
(4) hydrogen, 5% Pd—C, ethanol.

(5)
  (i) (COCl)$_2$, benzene, DMF
  (ii) aqueous ammonia diglyme.
(6) SOCl$_2$, DMF.

Route 4

(1) Sodium Nitrite, H$_2$SO$_4$
(2) PhCH$_2$Br, DMF (Ph=phenyl)
(3) DCC, N—PPY, CH$_2$Cl$_2$
(4) H$_2$/Pd—C
(5) Oxalyl Chloride, DMF; NH$_3$
(6) SOCl$_2$, DMF Although route 4 is shown for a case where X is an R-biphenyl group, the method works equally well using any appropriate carboxylic acid in step (3).

In route 4, the group 3 in the starting amino acid is the group B of the final product. The amino acid may be used in any of its enantiomeric forms (a racemic amino acid would lead to a racemic product). The residue B in the starting amino acid may itself contain an asymmetric carbon atom, for example in the case of isoleucine.

Various other compounds wherein the unit —YWCH(Z)— is —COO CH(CN)— may be made via routes derived from routes 1–4 above. For example compounds of structure 3.4 may be made by esterifying the product of step 3(2) with the acid produced in step 2(2) and proceeding via a route analogous to steps 2(3) to 2(6).

Compounds of structure 3.5 may be prepared via route 5 shown in FIG. 5 starting from the commercially available biphenyl and bromobenzoic acid.

Route 5

(1) When the F is present: n-BuLi, ether, −35° C., 20 min, ZnCl$_2$, THF, N$_2$. When the F is not present: n-BuLi, ether, −5° to −10° C., 45 min; ZnCl$_2$, THF, N$_c$
(2) An appropriate alcohol or phenol, eg the product of steps 4(2) or 3(2), DCC, N—PP$_y$, CH$_2$Cl$_2$.
(3) Pd[Ph$_3$P]$_2$Cl$_2$, di-isobutylaluminium hydride, THF N$_2$.

The product of step 5(3) may then be converted to the cyano compound eg of structure 3.5 by a method analogous to steps 4(4)–4(6).

Route 6

(1) esterification of the alpha-hydroxy acid using eg DCC method. Some such esters may be commercially available, eg ethyl lactate.
(2) toluene-4-sulphonyl chloride, pyridine.
(3) K$_2$CO$_3$, acetonitrile.
(4) KOH, ethanol, H$_2$O.
(5) and (6), as steps 4(5) and (6)

FIGS. 1–6 preparative routes for compounds of the invention.

Examples of methods of preparation of compounds of Formula I, of ferroelectric smectic liquid crystal materials including them and of a liquid crystal electro-optic display device using them follow.

EXAMPLE 1

Preparation of;

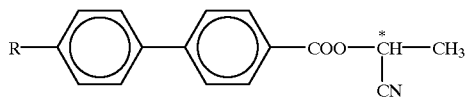

using Route 1.

Step 1(1)

5-(+)- Lactic acid (18.0 g) (previously redistilled from commercial product) was dissolved in methanol (360 ml), and water (40 ml) was added. The solution was trated to pH 7-0 with 20% aqueous caesium carbonate (ca 160 ml). The solvent was removed under reduced pressure at 50° C. and the residue was re-evaporated twice from DMF (2×100 ml) at the same temperature. The white solid caesium salt obtained was stirred with benzyl bromide (34.2 g) in DMF (300 ml) for 15 hours. The CsBr was then filtered off, the filtrate was concentrated and then ether was added to the residue (150 ml). The organic layer was washed successively with water (100 ml), saturated Na HCO$_3$ (500 ml) and water (100 ml) and finally dried (MgSO$_4$). After removal of the solvent the residual liquid was distilled under reduced pressure to afford the product as coulourless liquid (yield 28.8 g; 80%), bp 96° C./0.05 mm Hg[α]$^{24}$D−12.9.°

Step 1(2)

To a stirred mixture of 4-R-biphenyl-4$^1$--carboxylic acid (10.8 g) 5-(−)-benzyl lactate (5.9 g) prepared as in step 1(1) above, and N—PPy (0.49 g) in sieve-dried CH$_2$Cl$_2$ (250 ml) was slowly added a solution of DCC (7.5 g) in sieve dried CH$_2$Cl$_2$ (50 ml). The mixture was stirred for 5 h at room temperature. The N, N-dicyclohexyl urea was filtered off and the filtrate was washed successively with water (100 ml), 5% aqueous acetic acid (100 ml), water (2×100 ml) and finally dried (MgSO$_4$). After removal of the solvent, the crude diester was purified by column chromatography using silica gel and (4:1) dichloromethane:petroleum fraction (bp 60–80° C.) as eluent. The product was recrystallised from ethanol.

The properties of compounds prepared in this way were:

R=CqH$_{19}$ mp 60.5° C.; [α]$^{24}$D+21.6°
R=C$_{10}$H$_{21}$O mp 85° C.; [α]$^{24}$D+24.2°
R=C$_8$H$_{17}$O mp 62.5° C.; [α]$^{24}$D+24.7°

Step 1(3)

The produce of step 1(2) (10–12 g) was dissolved in ethyl acetate (150 ml). 5% Pd on charcoal (200 mg) was added and the mixture was stirred under an atmosphere of hydrogen overnight. After hydrogenation (500 ml of hydrogen was consumed) was completed, the catalyst was filtered off and the filtrate was evaporated to dryness. The colourless solid residue was recrystallised from petroleum fraction (bp 60–80° C.) to give the carboxylic acid as colourless needles.

R=C$_9$H$_{19}$ mp 106° C.; [α]$^{24}$D+32.3°
R=C$_{10}$H$_{21}$O mp 115° C.; [α]$^{24}$D+35.0°
R=C$_8$H$_{17}$O mp 126° C.; [α]$^{24}$D+40.8°

Step 1(4)

The carboxylic acid of step 1(3) (0.01 mol) was initially converted into the acid chloride by reacting with oxalyl chloride (0.02 mol) and sieve-dried DMF (3 drops) in sodium-dried benzene (50 ml) for 3 hours at room temperature. The excess of oxalyl chloride and the solvent were removed by distillation under reduced pressure. The crude acid chloride residue was dissolved in diglyme (20 ml) and then an aqueous solution of ammonia (25 ml, d=0.88) was added dropwise with vigorous stirring. After the addition the reaction mixture was stirred for 1½ hours at room temperature. The reaction mixture was then diluted with cold water (200 ml) and the product was filtered off, washed with excess water and then finally dried in air. The product was crystallised from petroleum fraction (bp 80–100° C.) to yield the amide as a white powder.

R=C$_9$H$_{19}$ yield=2.6 g (66%); mp 145° C.; [α]$^{24}$D+48°
R=C$_{10}$H$_{21}$O yield=1.8 g (47%); C$_1$ 130 C$_2$ 143 I [α]$^{24}$D+ 43.4

Step 1(5)

A mixture of redistilled thionyl chloride (0.063 mol) and sieve-dried DMF (10 ml) was added dropwise to a vigorously stirred solution of the product of step 1(4) (0.0063 mol) in DMF (30 ml). After the addition the reaction mixture was stirred at room temperature for 2 hours, poured onto ice-water (200 ml) and the product extracted into ether (2×100 ml). The combined ether extracts were washed with saturated aqueous sodium hydrogen carbonate (2×100 ml), followed by water (100 ml) and finally dried (MgSO$_4$). After the removal of the solvent the product was purified by column chromatography on silica gel, eluting with a 3:1 mixture of chloroform:petroleum fraction (bp 60–80° C.). The appropriate fractions containing the product were concentrated and recrystallised from 95% aqueous ethanol to yield the final nitrile product as a white crystalline solid.

R=C$_9$H$_{19}$ yield=1.7 g (71%) mp 55.0° C. $^{24}$D+55°
R=C$_{10}$H$_{21}$O yield=0.92 g (62%), mp 98.5° C. $^{24}$D+6.5

EXAMPLE 2

Preparation of

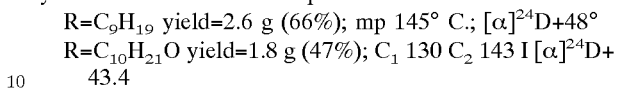

using Route 2.

Step 2(1)

To a stirred mixture of the ethyl 4-hydroxybenzoate (0.063 mol) and 2,3-dihydropyran (0.25 mol) in ethyl acetate (80 ml) was added dropwise a saturated solution of hydrogen chloride in ethyl acetate (5 ml). After the addition the reaction mixture was stirred for 24 hours at room temperature. The mixture was then washed with 10% aqueous sodium hydroxide (2×50 ml), followed by water (2×50 ml) and finally dried (MgSO$_4$). After removal of the solvent by distillation under reduced pressure the oily residue was purified by distillation under reduced pressure to give a colourless liquid.

Yield=10.4 g (66%) bp 120–125° C./0.1 mm Hg (Short path distillation)

Step 2(2)

A solution of potassium hydroxide (0.076 mol) in water (10 ml) was added to a solution of the product of step 2(1) (0.038 mol) in C$_2$H$_5$OH (50 ml). The mixture was heated under reflux for 3 hours. On cooling, the solvent was removed by distillation under reduced pressure. Ice-water (100 ml) was added to the residue, and whilst being vigorously stirred and cooled below 10° C., 50% aqueous hydrochloric acid was added until the acidity of the mixture reached about pH3. The product was extracted into ethyl acetate (2×100 ml) and the combined organic extracts were washed with water (2×100 ml) and dried (MgSO$_4$). After removal of the solvent the crude material was crystallised from 2:1 toluene:Petroleum fraction (bp 80–100° C.) to give the carboxylic acid as white crystals.

Yield=5.8 g (69%), decomposed on heating at 145° C.

Step 2(3)

This step was performed using the product of Step 1(1) (the benzyl ester of S-(+)-lactic acid) in a method analogous to step 1(2) (esterification of the lactic acid alpha-hydroxy group) using the carboxylic acid prepared in step 2(2). The product as obtained by column chromatography was used in subsequent steps without further purification.

The product had mp below 20° C.; $[\alpha]^{24}D+18°$.

Step 2(4)

A solution of oxalic acid (0.0031 mol) in water (8 ml) was added to the product of step 2(3) (0.0156 mol) and the whole was gently refluxed for 2 hours. The solution was cooled and the solvent was removed by distillation under reduced pressure. The residue was heated with water (50 ml) and the product was extracted into ether (2×50 ml), and the combined ether extracts were washed with water (50 ml) and dried ($MgSO_4$). The oily crude product (single spot on tlc) was used for step 2(5) without further purification.

Yield=4.5 g (95%); $[\alpha]^{24}D+15°$,

Step 2(5)

This step was performed using a DCC method of esterification analogous to that used in step 1(2) but using the phenol product of step 2(4) instead of the benzyl lactate for esterification with the 4-R-biphenyl-$4^l$-carboxylic acid.

R=$C_9H_{19}O$; C 104° ($S_c$ 90°) $S_A$ 133.5° Ch 135.5° I $[\alpha]^{24}D+6.9°$ Step 2(6)

This step involved three separate steps (denoted (a), (b) and (c) below) analagous to steps 1(3), 1(4) and 1(5). The properties of the products of each of these separate steps for R=$C_9H_{19}O$ are as follows:

(a) C149 $S_A$ 198 I; $[\alpha]^{24}D+17.6°$
(b) C180 $S_A$ 189 I; $[\alpha]^{24}D+15.0°$
(c) C121 $S_C$ 132 $S_A$ 181 I; $[\alpha]^{24}D-2.3°$

EXAMPLE 3

Preparation of

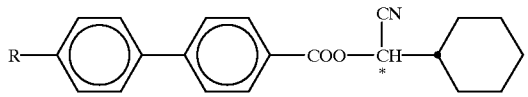

Step 3(1)

(ref Stocker J Org Chem 27, 2288, (1962)).

A mixture of L-(+)-mandelic acid (10 g), acetic acid (1 ml) and 5% Rh/$Al_2O_3$ (1.95 g) in methanol (70 ml) was stirred under hydrogen (30 atm) until the uptake of hydrogen was complete. The catalyst was filtered off and the solvent was removed. Recrystallisation from carbon tetrachloride gave the cyclohexyl compound as a white crystalline solid.

Yield=85%; mp=128° C.

Step 3(2)

(ref SS Wang J-Org-Chem, 41, 3258, (1976)

A solution of the product of step 3(1), (5 g) in the minimum volume of 4:1 ethanol:water was titrated to pH7 with aqueous caesium carbonate (20% W/V). The solution was then evaporated to dryness and the last traces of water were removed by co-distillation with sodium-dried benzene (2×100 ml). The residue was dissolved in sieve-dried DMF (100 ml) and benzyl bromide (5.3 g) was added, with stirring. Stirring was continued for 12 hours after which time the precipitated caesium bromide was filtered off and the solvent was removed under reduced pressure. Water was added to the residue, and the product was extracted into ethyl acetate (100 ml) and the extracts were dried ($MgSO_4$). Purification was by column chromotography on silica gel using 1:3 ethyl acetate/petroleum fraction (bp 60–80° C.) or eluent, followed by recrystallisation from petroleum fraction (bp 40–60° C.).

Yield=79%; mp 47° C.

Step 3(3)

(ref A Hassner, V Alexanian, Tetrahedron, 46, 4475, (1978))

A solution of the appropriate carboxylic acid, in this case n-4-octyloxybiphenyl-$4^1$-carboxylic acid (10 m mol), the product of step 3(2) (11 m mol), DCC (11 m mol) and N—PPy (1 m mol) in sieve-dried dichloromethane (50 ml) was stirred with exclusion of moisture. The progress of the reaction was followed by tlc on silica gel, eluting with 2:1 chloroform:petroleum fraction (bp 60–80° C.). The mixture was filtered off and the filtrate was washed successively with water (3×50 ml), 5% acetic acid (3×50 ml) and again water (3×50 ml), then finally dried ($MgSO_4$). The product (an oil) was purified by column chromatography on silica gel, eluting with 2:1 chloroform:petroleum fraction (bp 60–80° C.) to give the product as colourless liquid.

Yield=67%; $[\alpha]^{25}D+5.3°$.

Step 3(4)

A mixture of the product of step 3(3) and (1 g) and 5% Pd—C in ethanol (25 ml) was stirred under an atmosphere of hydrogen until uptake of the gas had ceased. The catalyst was filtered off and the solvent removed by distillation under reduced pressure. Purification of the crude product was by column chromatography on silica gel, eluting with a 5:1 chloroform:methanol. Recrystallisation from petroleum fraction (bp 60–80° C.) gave the carboxylic acid as a white crystalline solid.

Yield=86%: mp=83° C.; $[\alpha]^{25}D-39.5°$

Step 3(5)

A suspension of the product of step 3(4) (0.5 g) in a mixture of sodium-dried benzene (25 ml), oxalyl chloride (0.25 g) and DMF (one drop) was stirred for 2 hours. The solvent was removed by distillation under reduced pressure and the residue was dissolved in dry diglyme (50 ml). Aqueous ammonia (d=0.88, 10 ml) was added to this solution with vigorous stirring during 30 min, and stirring was continued for a further 30 minutes. The mixture was diluted with water (100 ml) and the precipitated amide was filtered off. Recrystallisation from 4:1 ethanol:water gave the product as a white powder.

Yield=82%, mp 126° C.

Step 3(6)

A solution of the product of step 3(5) (0.47 g), thionyl chloride (1.2 g) and dry DMF (30 ml) was stirred for 8 hours. The reaction mixture was then poured into water (50 ml) and the nitrile was extracted into ether (3×50 ml). The combined ether extracts were washed with saturated sodium hydrogen carbonate solution and dried ($MgSO_4$). Purification of the crude nitrile was by column chromatography on silica gel, eluting with 1:5 ethyl acetate:petroleum fraction (6 p 60–80° C.). Recrystallisation from 4:1 ethanol:water gave the nitrile as a white crystalline solid.

Yield=78%, mp 58.5° C.; $[\alpha]^{25}D-10.5$.

EXAMPLE 4

Ferroelectric smectic liquid crystal mixtures containing compounds of Formula I in hosts which are compounds of formula 4.1.

Mixture A:

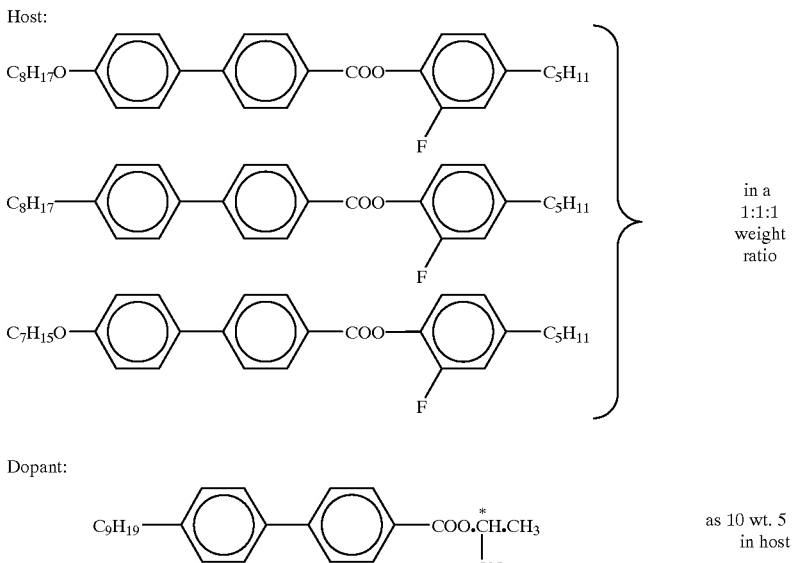

Transition temperatures;
$S_?$ ca. 40 $S_C$ 66.8 $S_A$ 111.8 N 134.7 I
Ferroelectric properties;

| Temperature (° C.) | Extrapolated Ps (nC cm$^{-2}$) | Tilt angle of $S_C$ phase (°) |
|---|---|---|
| 65 | 56 | 2.5 |
| 60 | 133 | 5.5 |
| 40 | 315 | 9.5 |

The extrapolated pitch of the $S_C$ phase of the mixture was 0.201 μm

EXAMPLE 5

An example of route 4 to prepare:

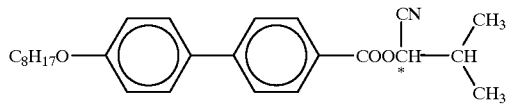

Step 4(1)

A cold solution of sodium nitrite (26.4 g, 0.384 mol) in water (105 ml) was added dropwise to a stirred and cooled solution of L-valine (30.0 g, 0.256 mol) in 0.5 M sulphuric acid (390 ml) during 3 hours, maintaining the temperature between 0° C. and −2° C. The reaction mixture was left starring at room temperature overnight, then adjusted to pH6 by adding solid sodium bicarbonate. The solution was concentrated under reduced pressure at 50° C. to about 150 ml. The solution was acidified to pH3 with 40% $H_3PO_4$ and the crude product was extracted into THF (2×200 ml). The THF solutions were washed with brine, dried ($MgSO_4$) and concentrated under reduced pressure at 50° C. to give an oil.

The crude product was taken in water (105 ml) and decolourized with charcoal at room temperature. A concentrated solution of sodium hydroxide was added dropwise to the cold solution adjusting the pH to 4.5–5. Acetone (3 times the volume of the aqueous solution) was added and the precipitate which formed was filtered off and dried (in vacuo $CaCl_2$).

yield=22 g (61%) $[\alpha]_D^{20}$=−13.95° ($H_2O$).

Step 4(2)

A mixture of the product of step 4(1) (10.0 g 72 mmol), benzyl bromide (12.2 g 72 mmol) and sieve dried DMF (120 ml) was stirred at room temperature for 24 hours. The DMF was removed under reduced pressure (at 50–55° C.) and the remaining suspension was diluted with ether (100 ml) and filtered. The filtrate was washed successively with water, sodium bicarbonate solution, water, and dried ($MgSO_4$). After distilling off the solvent (below 55° C.) the crude product was obtained.

yield=14.4 g (96%).

The crude product was purified by distillation at 135–140° C./0.6–0.65 mm Hg.

Step 4(3)

To a stirred mixture of 4'-octyloxy-4-carboxylic acid (10.8 g 0.033 mol), the product of step 4(2) (6.9 g 0.033 mol) and N—PPY (0.49 g 0.033 mol) in sieve-dried dichloromethane was slowly added a solution of DCC (7.5 g 0.036 mol) in sieve-dried dichloromethane (50 ml) over a period of 20 min.

The reaction mixture was stirred for 6 hours at room temperature. The N,N-dicyclohexylurea was filtered off and the filtrate was washed successively with water, 5% aqueous acetic acid, water and finally dried ($MgSO_4$). After removal of the solvent, the crude diester was purified by column chromatography using silica gel with 4:1 dichloromethane:light petroleum (bp 60–80° C.) as eluent, to give a viscous liquid product.

yield=12.5 g (74%).

Step 4(4)

The product of step 4(3) (12.5 g 24.2 mmol) was dissolved in ethyl acetate (160 ml) and 5% Pd on charcoal (200 mg) was added. The mixture was stirred overnight under an atmosphere of hydrogen (the reaction was monitored by TLC). After hydrogenolysis was complete (ca 550 ml of $H_2$), the catalyst was filtered off and the filtrate was evaporated to dryness to give a solid product. The solid gave a single spot on TLC and was used without further purification.

yield=9.7 g (95%) mp=80–83° C.

Step 4(5)

The carboxylic acid from 4(4) (9.4 g 22.06 mmol) was initially converted into the acid chloride by reacting with oxalyl chloride (5.75 g 44 mmol) and sieve dried DMF (2 drops) in sodium - dried benzene (25 ml) for 3 hours at room temperature. The excess of oxalyl chloride and the solvent were removed by distillation under reduced pressure. The crude acid chloride was dissolved in diglyme (10 ml) and added to an aqueous solution of ammonia (5 g=0.88, 100 ml) with stirring. After the addition the reaction mixture was stirred for ½ at room temperature, then the product was filtered off, washed with water and dried (in vacuo $CaCl_2$).

yield=9.4 g (100%) mp=95–97° C.

Step 4(6)

A mixture of thionyl chloride (26.3 g 221 mmol) and sieve-dried DMF (100 ml) was added dropwise during 30 minutes to a vigorously stirred solution of the amid from step 4(5) (9.0 g, 22.1 mmol) in sieve-dried DMF (100 ml). After the addition the reaction mixture was left stirring at room temperature for 8 hours, was then poured onto ice-water and the product was extracted into ether (2×300 ml). The ether extracts were washed successively with a saturated solution of sodium bicarbonate and water, and then dried ($MgSO_4$). After After removal of the solvent the product was purified by column chromatography on silica gel, eluting with 1:3 ethyl acetate:light petroleum (bp 40–60° C.).

yield=8, 3 g (97%)

The product from the column was recrystallised from light petroleum (bp 40–60° C.) to give a white crystalline solid.

mp=66.9° C. $[\alpha]_D^{20}$=−3.1° ($CHCl_3$).

The compounds listed below were prepared using an identical method with the appropriate carboxylic acid in step 4(3) and the amino acid indicated in step 4(1).

General formula

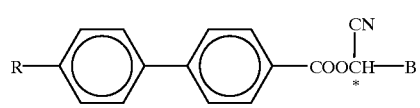

| R | B | $[\alpha]_D^{20}$ = ($CHCl_3$) | Liquid Crystal Transitions |
|---|---|---|---|
| $C_8H_{17}O$ | $CH_2CH(CH_3)_2$ | −17.5° | K 46 I |
| (L-Leucine, S-(+)-Leucine) | | | |
| $C_8H_{17}O$ | $CH(CH_3)_2$ | −3.1° | K 67 I |
| (L-Valine, S-(+)-Valine) | | | |
| $C_8H_{17}O$ | $^+CH(CH_3)CH_2CH_3$ | −5.4° | K 74 I |
| (L-Isoleucine; (2S,3S)-(+)-2-amino-3-methylpentanoic acid) | | | |
| $C_8H_{17}O$ | $(CH_2)_3CH_3$ | −10.6° | K 59 I |
| (L-Norleucine; (S)-(+)-2-aminohexanoic acid) | | | |

EXAMPLE 6

Preparation of:

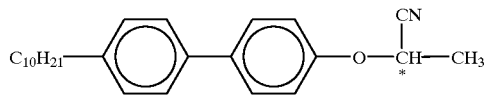

using Route 6.

Step 6(3)

4-n-decyl-4'-hydroxybiphenyl (0.02 mol), tosyl lactate (0.024 mol) and anhydrous potassium carbonate (0.024 mol) in sieve-dried acetonitrile (100 ml) was gently refluxed with vigorous stirring for 20 hr. The cooled reaction mixture was poured into cold water (200 ml) and extracted with ether (2×150 ml). The combined ether extracts were washed with water (100 ml), cold 5% aqueous NaOH (100 ml), water (2×100 ml) and dried ($MgSO_4$). After removal of the solvent, the solid residue was recrystallised from 95% aqueous ethanol to yield the product as colourless crystals.

Yield 5.5 g (67%), mp 39° C. $[\alpha]_D^{24}$+19.1° ($CHCl_3$)

Step 6(4)

The product of step 6(3) (0.012 mol), KOH (0.0144 mol) in water (15 ml) and ethanol (50 ml) was gently refluxed for 1 hr. Excess solvent was removed under reduced pressure and the residue was diluted with cold water (50 ml) and them carefully acidified by the addition of dilute HCl until a pH of about 2 was obtained. The mixture was extracted with ether (3×50 ml) and the combined ether extracts were washed with water (50 ml) and dried ($MgSO_4$). After removal of the solvent, the solid residue was recrystallised from petroleum ether (80–100° C.).

Yield 4.3 g (93%), mp 110.5° C. $[\alpha]_D^{24}$+8.4° ($CHCl_3$)

Step 6(5)

This was carried out using a similar method to that of Route 1 step 4. The starting materials were the product of step 6(4) (0.011 mol), oxalyl chloride (0.021 mol) in benzene (60 ml), DMF (2 drops) and 35% aq. $NH_3$ in diglyme (100 ml). The crude product was crystallised from petroleum ether (100–120° C.).

Yield 3.6 g, (88%), mp 171° C.

Step 6(6)

This was carried out using a method similar to that of Route 1 step 5. The starting materials were the product of step 6(5) (0.0087 mol), thionyl chloride (0.0087 mol) in DMF (80 ml). The crude product was chromatographed using silica gel and eluted with $CH_2Cl_2$. The purified material was crystallised from ethanol.

Yield 2.6 g, (84%), mp 66° C. $[\alpha]_D^{24}$+96.8° ($CHCl_3$)

EXAMPLE 7

Using the methods outlined in the description above the following compounds were also prepared:

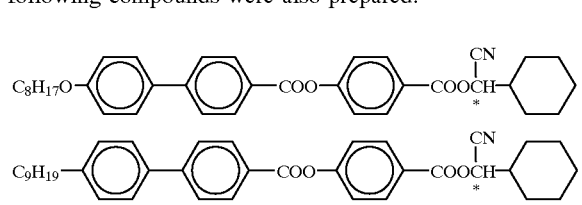

solid-I 107.5° (76° $S_A$)
supercools to 41°
24
-18.3° $CHCl_3$

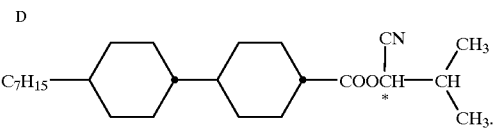

A

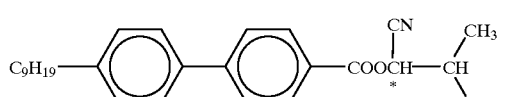

B

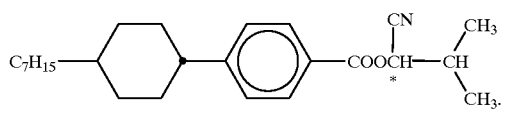

C

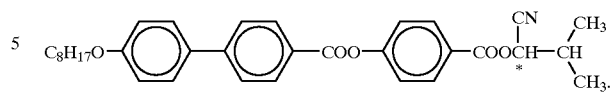

D

Some of their properties are listed below:

A. solid—isotropic 84.3°, $[\alpha]_D^{20}$ -28.1 ($CHCl_3$)

B. solid$^1$—solid$^2$ 29.4°, solid—isotropic 32.2° $[\alpha]_D^{20}$ -4.8° ($CHCl_3$)

C. liquid, mp below -20° C. $[\alpha]_D^{20}$ -16.9° ($CHCl_3$)

D. solid—$S_C$ 102°, $S_C$-$S_A$ 145°, $S_A$-I 154.6 $[\alpha]_D^{20}$ -9.35° ($CHCl_3$).

TABLE 5

| | $P_S$ nCcm$^{-2}$ | N* p μm | SOP/ pP$_S$ | SON* | Trans. Temps. (10% in Hl) | | |
|---|---|---|---|---|---|---|---|
| | | | | | N $S_A$ | $S_C$ | $S_7$ |
| C$_9$—⌬—⌬—CO$_2$C*HC$_1$ / CN | 180 | 0.20 | 36 | L+ | 112 | 67 | 40 |
| C$_9$O—⌬—⌬—CO$_2$C*HC$_1$ / CN | 137 | | | L+ | 115 | 81 | 33 |
| C$_9$O—⌬—⌬—CO$_2$—⌬—CO$_2$C*HC$_1$ / CN | 70 | 0.58 | 41 | L+ | 133 | 78 | 49 |
| C$_8$O—⌬—⌬—CO$_2$C*HC$_4$ / CN | 139 | 0.27 | 38 | D+ | 112 | 72 | 25 |
| C$_8$O—⌬—⌬—CO$_2$C*HCHC$_1$ / CN C$_1$ | 164 | 0.53 | 87 | D+ | 111 | 74 | 23 |
| C$_8$O—⌬—⌬—CO$_2$C*H CH$_2$CHC$_1$ / CN C$_1$ | 125 | 0.22 | 28 | D+ | 110 | 59 | 27 |
| C$_8$O—⌬—⌬—CO$_2$C*HC*HCH$_2$C$_1$ / CN C$_1$ | — | 0.15 | — | D | | | |

TABLE 5-continued

| | $P_S$ nCcm$^{-2}$ | N* p μm | SOP/ pP$_S$ | SOP/ SON* | Trans. Temps. (10% in HI) N | $S_A$ | $S_C$ | $S_7$ |
|---|---|---|---|---|---|---|---|---|
| C$_8$O—⌬—⌬—CO$_2$C*H(CN)—cyclohexyl | 112 | 0.60 | 67 | D+ | 105 | 58 | 22 | |
| C$_9$—⌬—⌬—CO$_2$—⌬—CO$_2$C*H(CN)—cyclohexyl | | | | D+ | 128 | 63 | 45 | |
| C$_{10}$—⌬—⌬—OC*HC$_1$(CN) | 2.5 | 0.68 | 2 | + | 101 | 80 | 37 | |

Component B is present in the range sufficient to enable A+B=100 wt %, and is at least two compounds selected from:

[structural formulas of liquid crystal compounds with $R_1$, $R_2$, $F_a$, $F_b$, $F_c$ substituents]

wherein a, b and c are independently 0, 1 or 2; $R_1$ and $R_2$ are $C_{1-15}$ straight or branched chain alkyl or alkoxy, preferably $C_3$–$C_{12}$. In the above (for Component B) CH═CH linking groups may be replaced by $C_2H_4$ and $CH_2O$ linking groups may be replaced by $OCH_2$.

Preferably Component A is present in the range 1–15 wt %, even more preferably 1–5 wt %.. Preferably any one compound constituting Component B is present in the range 5–60 wt %, even more preferably 10–30%.

Preferably the material contains optically active dopants of the formula below

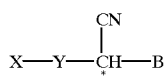

in which X is a group having a general structure:

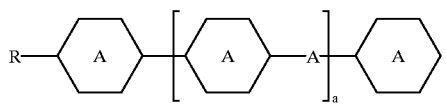

where R is selected from hydrogen or $C_{1-12}$ alkyl or alkoxy, each of the rings

is the same or different and is each independently selected from phenyl, halogen-substituted phenyl or trans cyclohexyl, A is selected from a single bond, COO or OOC, a is 0 or 1, Y is selected from COO or O, and B is alkyl containing 1–12 carbon atoms, cyclohexyl or a group

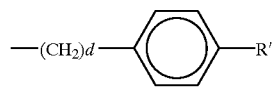

where d is 0 or 1 and R' is selected from hydrogen or $C_{1-12}$ alkyl or alkoxy.

Preferably the device has a $V_{min}$ less than 45 volts and/or a $t_{min}$ less than 100 μs.

Component A may be further characterised in that it may combine one or more chiral components with (−) left-handed cholesteric twist sense with one or more chiral components with (+) right-handed twist sense. None of the (−) components can be the optical enantiomers of the (+) components. This chiral mixture may be a chiral smectic itself or maybe used as an additive to a non-chiral and or racemate tilted smectic liquid crystal host material. Alternatively the chiral component or components may have the same cholesteric twist sense providing the cholesteric pitch and Ps are characterised by a tilted chiral smectic liquid crystal material having a cholesteric phase at an elevated temperature above ambient between the chiral smectic and isotropic phases with a cholesteric pitch p greater than half the layer thickness d over a temperature range of at least 0.1° C. above a cholesteric to smectic transition temperature and a significant spontaneous polarisation in the chiral smectic phase. U.S. Pat. No. 5,061,047 describes some relevant methods for making liquid crystal display devices.

The value of Ps is at least 0.1 and preferably 1 or more $nC/cm^2$.

The layer thickness may be up to 15 μm or more but is typically 1–12 μm.

BRIEF DESCRIPTION OF DRAWINGS

The invention will now be described by way of example only with reference to the accompanying drawings of which.

Figure 1:
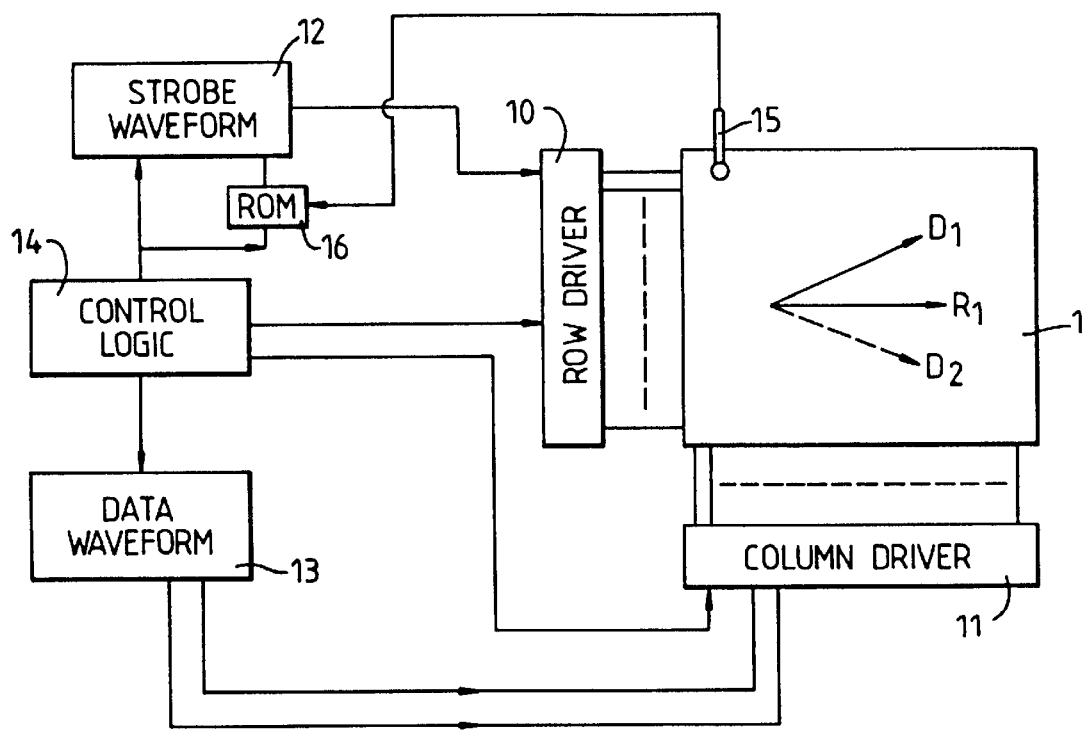
FIG. 1 is a diagrammatic view of a time multiplex addressed x, y matrix.
Figure 2:
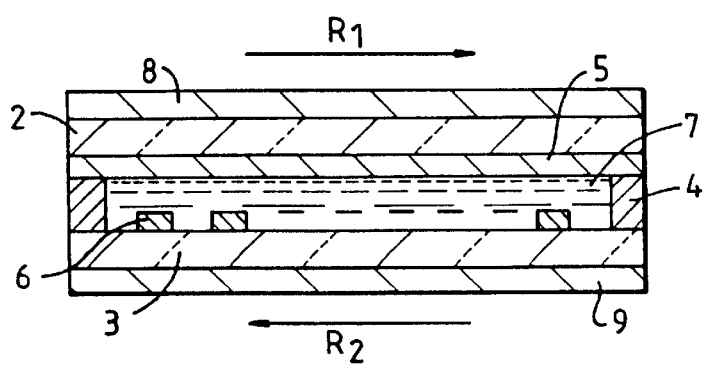
FIG. 2 is a cross section of part of the display of FIG. 1 to an enlarged scale.
Figure 3:
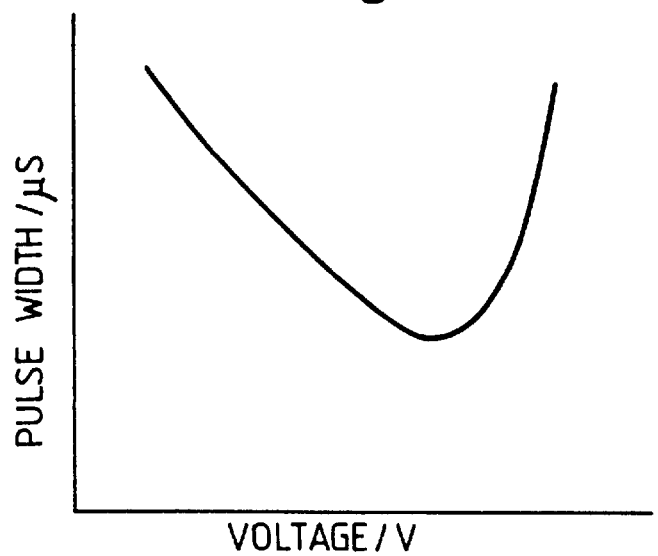
FIG. 3 is a representation of a turnaround in a ($t_{min}/V_{min}$) feature.
Figure 4:
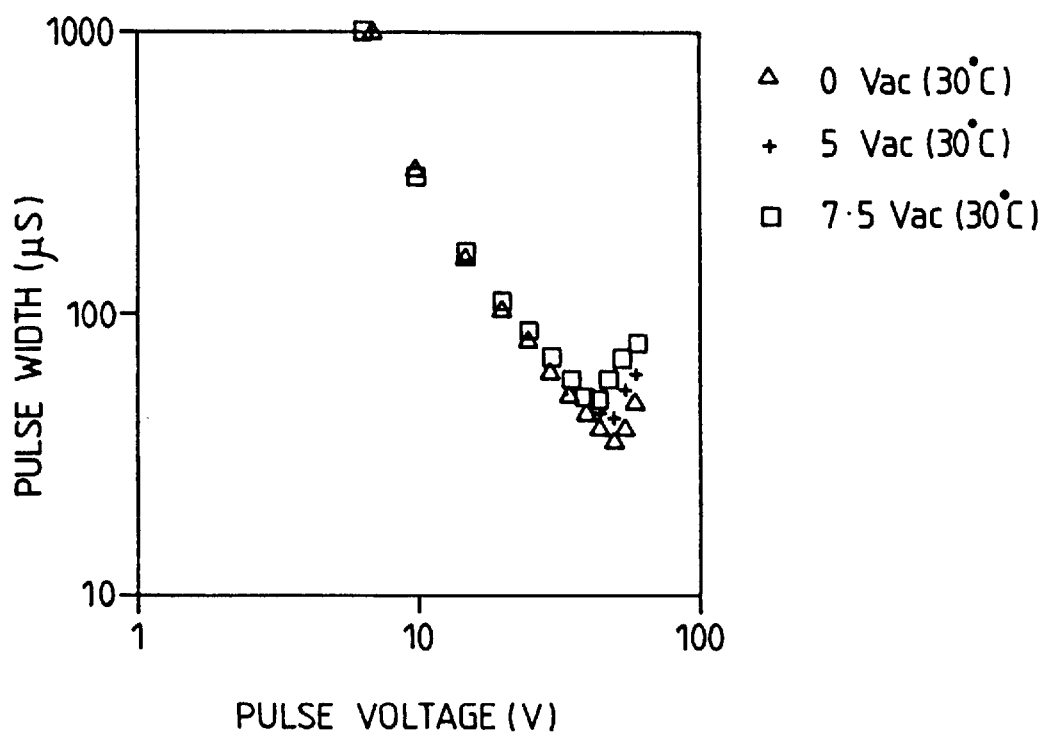
FIGS. 4–6 are graphs of t/μs versus V/V at 30° C. for mixtures 1, 2 and 3 respectively, (see Table 1 for mixtures).
Figure 5:
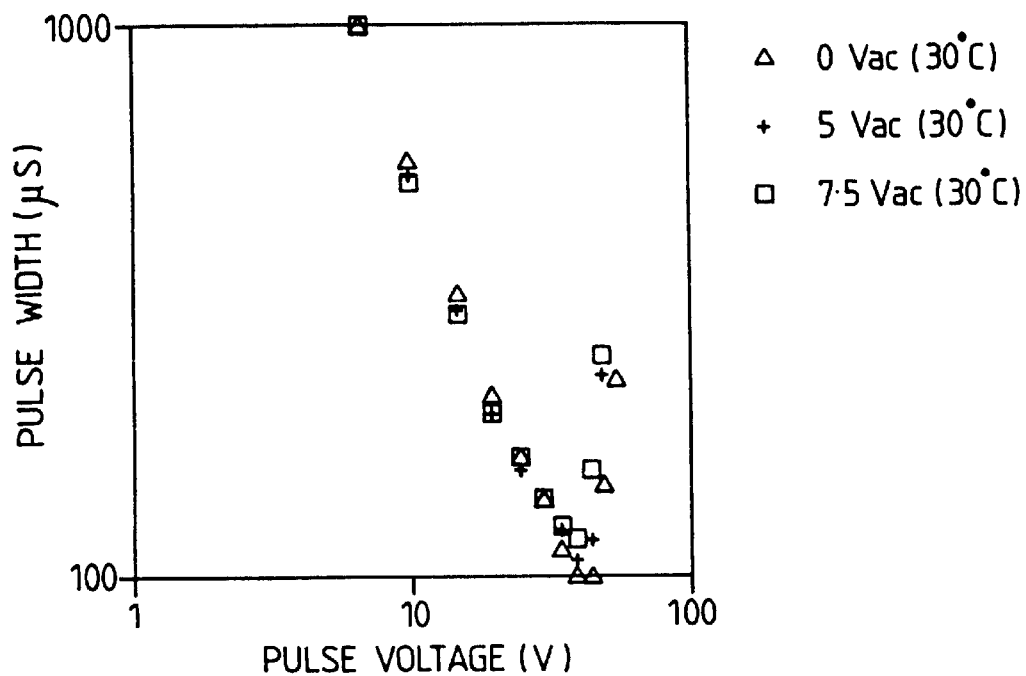
Figure 6:
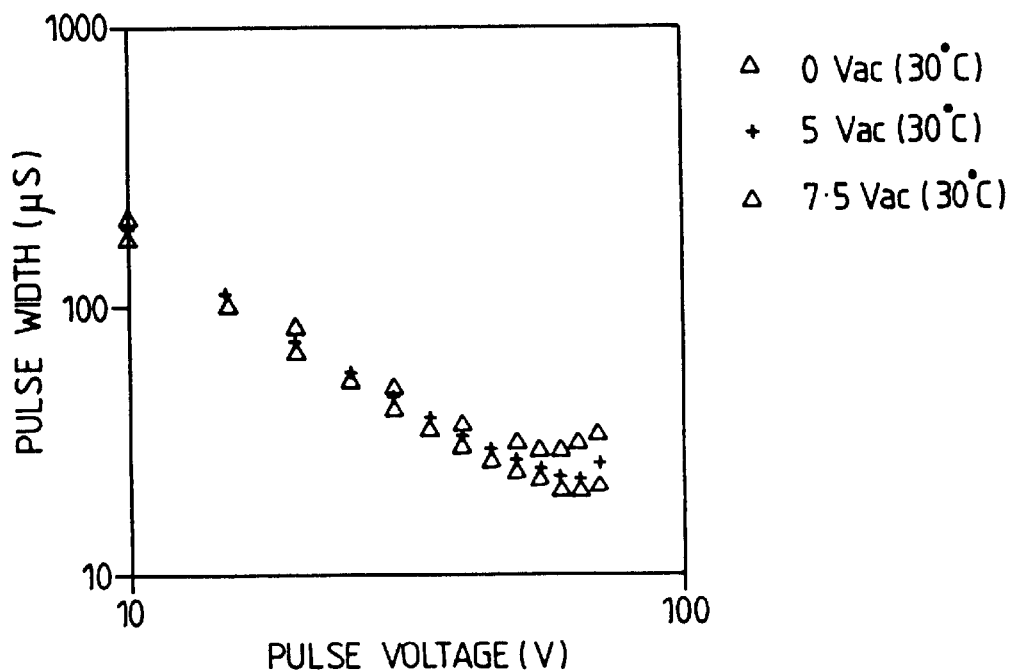

The display 1 shown in FIGS. 1, 2 comprises two glass walls 2, 3 spaced about 1–6 μm apart by a spacer ring 4 and/or distributed spacers.

Electrode structures 5, 6 of transparent tin oxide are formed on the inner face of both walls. These electrodes are shown as rows and columns forming an X, Y matrix but may be of other forms. For example, of segments formed into a digital seven bar display.

A layer 7 of liquid crystal material is contained between the walls 2, 3 and spacer ring 4.

Polarisers 8, 9 are arranged in front of and behind the cell 1. Row 10 and column 11 drivers apply voltage signals to the cell. Two sets of waveforms are generated for supplying the row and column drivers 10, 11. A strobe wave form generator 12 supplies row waveforms, and a data waveform generator 13 supplies ON and OFF waveforms to the column drivers 11. Overall control of timing and display format is controlled by a contrast logic unit 14.

Prior to assembly the walls 2, 3 are surface treated for example by spinning on a thin layer of polyamide or polyimide, drying and where appropriate curing; then buffing with a soft clean cloth (eg rayon) in a single direction R1, R2. This known treatment provides a surface alignment for liquid crystal molecules. In the absence of an applied electric field the molecules align themselves along the rubbing direction; R1 and R2 are parallel (+/−30°) in the same or opposite directions. When suitable unidirectional voltages are applied the molecular director aligns along one of two directors D1, D2 which are at an angle of about 45° to each other.

The device includes means of discriminating the states optically, eg 1 or more polarisers. It may operate in a transmissive or reflective mode. In the former, light passing through the device eg from a tungsten bulb is selectively transmitted or blocked to form the desired display. In the reflective mode a mirror is placed behind the second polariser 9 to reflect ambient light back through the cell 1 and two polarisers. By making the mirror partly reflecting the device may be operated both in a transmissive and reflective mode.

Pleochroic dyes may be added to the material 7. In this case, only one polariser is needed and the layer thickness may be 4–10 μm.

For a typical thickness of 2 μm the material at, for example, 22° C. is switched by a dc pulse of + or −50 volts for 100 μs. The two switched states D1, D2 may be arbitrarily defined as ON after receiving a positive pulse and OFF after receiving a negative pulse of sufficient magnitude. Polarisers 8, 9 are arranged with their polarisation axes perpendicular to one another and with one of the axes parallel to the director in one of the switched states.

In operation, strobe waveforms are applied to each row in turn whilst appropriate ON or OFF data waveforms are applied to each column electrode. This provides a desired display pattern formed by some x, y intersection in an ON state and another in an OFF state. Such addressing is termed multiplex addressing.

The following compounds and mixtures are examples illustrative of the invention.

| | | R | R' | % |
|---|---|---|---|---|
| A | $C_8H_{17}O$—〇—〇—$CO_2C^*H(CN)CH(CH_3)_2$ | | | |
| $B_1$ | R—〇—〇—$CO_2$—〇(F)—R' | $C_8H_{17}$<br>$C_8H_{17}O$<br>$C_7H_{15}O$ | $C_5H_{11}$<br>$C_5H_{11}$<br>$C_7H_{15}$ | 33.3<br>33.3<br>33.3 |
| $B_2$ | RO—〇(N,N)—〇—R' | $C_7H_{15}$<br>$C_9H_{19}$ | $C_9H_{19}$<br>$C_9H_{19}$ | 33.3<br>66.6 |
| $B_3$ | RO—〇—〇(F)—〇—R' | $C_6H_{13}$<br>$C_4H_9$<br>$C_8H_{17}$<br>$C_{10}H_{21}$ | $C_5H_{11}$<br>$C_5H_{11}$<br>$C_5H_{11}$<br>$C_5H_{11}$ | 22.0<br>32.5<br>29.5<br>16.0 |
| $B_4$ | $C_8H_{17}O$—〇—$CO_2$—〇(F)—$C_5H_{11}$ | | | |

TABLE 1

Mixtures containing compound $B_1$

| | Mixtures | | |
|---|---|---|---|
| | 1<br>1% A in<br>$B_1/B_2$:1/1 | 2<br>1% A in<br>$B_1$: 40%<br>$B_3$: 40%<br>$B_4$:20% | 3<br>2.5% A in<br>$B_1$:77.5%<br>$B_4$:20% |
| $T_{A-C}/°$ C. | 66.5 | 65.5 | 77.5 |
| $\theta/°$ at 30° C. | 17 | 17 | 21 |
| $Ps/ \times 10^{-5}$ $Cm^{-2}$ at 30° C. | 3.2 | 2.2 | 9.9 |
| $E_{min}/Ps$<br>0 $V_{ac}$ | ($V_{min}$ = 50 V)<br>$6.8 \times 10^{11}$ | ($V_{min}$ = 42.5 V)<br>$10.2 \times 10^{11}$ | ($V_{min}$ = 62.5 V)<br>$3.8 \times 10^{11}$ |
| $t_{min} \times Ps^2$<br>0 $V_{ac}$ | ($t_{min}$ = 36 μs)<br>$3.7 \times 10^{-14}$ | ($t_{min}$ = 100 μs)<br>$4.8 \times 10^{-14}$ | ($t_{min}$ = 21 μs)<br>$20.6 \times 10^{-14}$ |
| $E_{min}/Ps$<br>7.5 $V_{ac}$ | ($V_{min}$ = 45 V)<br>$6.1 \times 10^{11}$ | ($V_{min}$ = 40 V)<br>$9.6 \times 10^{11}$ | ($V_{min}$ = 67.5 V)<br>$4.1 \times 10^{11}$ |
| $t_{min} \times Ps^2$<br>7.5 $V_{ac}$ | ($t_{min}$ = 50 μs)<br>$5.1 \times 10^{-14}$ | ($t_{min}$ = 117 μs)<br>$5.7 \times 10^{-14}$ | ($t_{min}$ = 29 μs)<br>$28.4 \times 10^{-14}$ |

$T_{A-C}$ = Smectic A–Smectic C phase transition temperature.
$\theta$ = Cone Angle.
Ps = Spontaneous Polarisation.
E = Electric field.
cell thickness (d/μm) for the three different mixtures 1,2 and 3 is 2.3, 1.9 and 1.65 respectively.

When analysing the data presented in Table 1 it is perhaps most instructive to consider the column headed $E_{min}/Ps$ and $t_{min} \times Ps^2$.

Tables 2 and 3 list Ps and θ data at different temperatures for Mixtures 1 and 2.

TABLE 2

Mixture 1

| Temp/° C. | Ps/nCcm$^{-2}$ | Cone Angle/° |
|---|---|---|
| 65 | | 1.3 |
| 60 | 1.39 | 9.0 |
| 50 | 2.13 | 13.0 |
| 40 | 2.66 | 15.0 |
| 30 | 3.15 | 16.5 |
| 20 | 3.60 | |

TABLE 3

Mixture 2

| Temp/° C. | Ps/nCcm$^{-2}$ | Cone Angle/° |
|---|---|---|
| 65 | 0.10 | 2.3 |
| 60 | 0.83 | 9.8 |
| 50 | 1.46 | 13.1 |
| 40 | 1.93 | 14.9 |
| 30 | 2.16 | 17.3 |
| 20 | 2.26 | 18.1 |

Various mixtures are assessed below, at 30° C. unless otherwise stated. Units for $V_{min}$ are V, units for $t_{min}$ are μs, units for Ps are nCcm$^{-2}$:

ZLI 5014-000 is a commercially available mixture from Merck.

$V_{min}$=60 $t_{min}$=26 Ps=2.7 nCcm$^{-2}$.

LB7 is a 1:1 mixture of the following:

2 parts

C₉H₁₉—[pyrimidine]—[phenyl]—OC₉H₁₉

1 part

C₉H₁₉—[pyrimidine]—[phenyl]—OC₇H₁₅ this mixture is then mixed with one part of the following:

C₈H₁₇O—[phenyl]—[difluorophenyl]—[phenyl]—C₅H₁₁ plus 5% of BE80F2N (1% active).
 $V_{min}=46$ $t_{min}=29$ Ps=1.9 nCcm$^{-2}$.
 AJS20 is a mixture of the following:

relative proportions 3.5
C₉H₁₉—[phenyl]—[difluorophenyl]—[phenyl]—C₇H₁₅

2.9
C₈H₁₇O—[difluorophenyl]—[phenyl]—C₅H₁₁

3.0
C₈H₁₇O—[difluorophenyl]—[phenyl]—[phenyl]—C₅H₁₁

3.1
C₉H₁₉O—[phenyl]—[pyrimidine]—C₉H₁₉ plus 5% of BE80F2N (1.75% active).
 $V_{min}=21.4$ $t_{min}=38$ Ps=2.3 nCcm$^{-2}$.
 AJS62 is a mixture of the following:

relative proportions 3.2
C₉H₁₉—[phenyl]—[difluorophenyl]—[phenyl]—C₇H₁₅

-continued 2.7
C₈H₁₇O—[difluorophenyl]—[phenyl]—C₅H₁₁

2.7
C₉H₁₉—[pyrimidine]—[phenyl]—OC₉H₁₉

1.0
[
C₈H₁₇O—[difluorophenyl]—[phenyl]—[phenyl]—C₅H₁₁   1

C₈H₁₇O—[difluorophenyl]—[phenyl]—[phenyl]—C₇H₁₅   1

C₆H₁₃O—[difluorophenyl]—[phenyl]—[phenyl]—C₅H₁₁   1
]

plus 5.1% of BE80F2N (1.8% active).

$V_{min}=70$ $t_{min}=19.6$

AJS64 is a mixture of the following:

relative proportions 7.7
C₉H₁₉—[phenyl]—[difluorophenyl]—[phenyl]—C₇H₁₅

7.7
C₈H₁₇O—[difluorophenyl]—[phenyl]—C₅H₁₁

7.7
C₈H₁₇O—[phenyl]—[difluorophenyl with extra F]—OC₆H₁₃

7.8
C₉H₁₉O—[phenyl]—[pyrimidine]—C₉H₁₉ plus 5.2% of BE80F2N (2.3% active).

$V_{min}=55$ $t_{min}=19.6$

AJS67 is a mixture of the following:

relative proportions

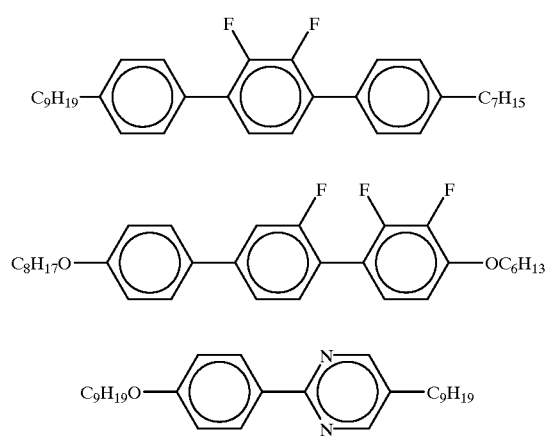

5.9

5.8

5.9 plus 5% of BE80F2N (2.25% active).

$V_{min}$=6.5 $t_{min}$=19 Ps=6.9 nCcm$^{-2}$. (7.5 Vac bias)

AJS32 is a mixture of the following:

proportion

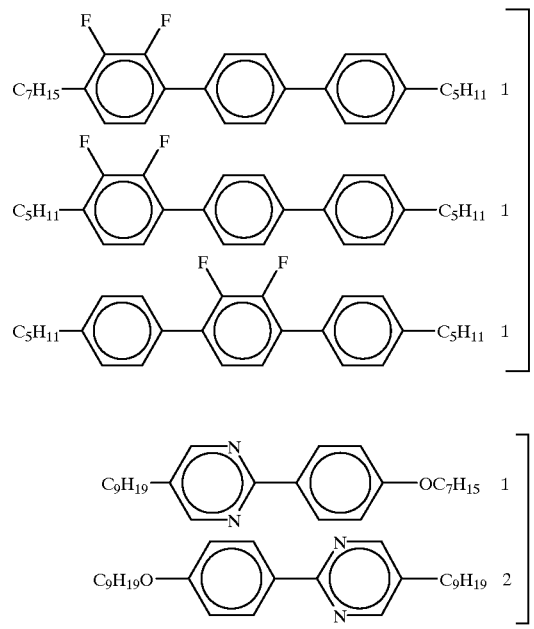

plus 1.75% of BE80F2N $V_{min}$=46 $t_{min}$=15 Ps=4.2 nCcm$^{-2}$.

VH53 is a mixture of the following:

relative proportion

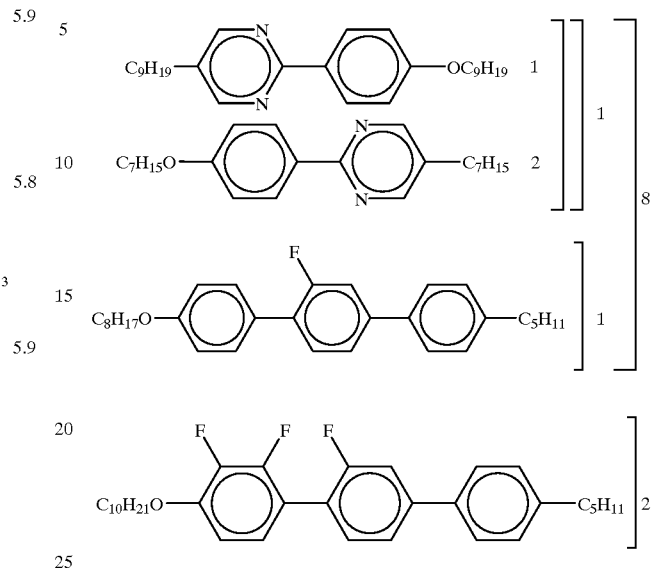

plus 5% of BE80F2N (1% active)
$V_{min}$=44 $t_{min}$=61 Ps=2.5 nCcm$^{-2}$.

LPM68 is a mixture of the following:

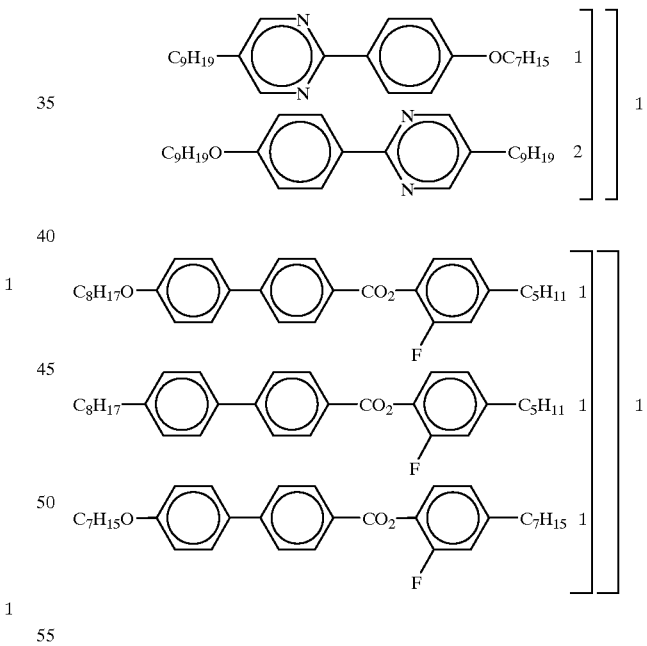

plus 1%, of IGS97
$V_{min}$=50 $t_{min}$=36 Ps=3.0 nCcm$^{-2}$.

13/291-1 is a mixture of the following:

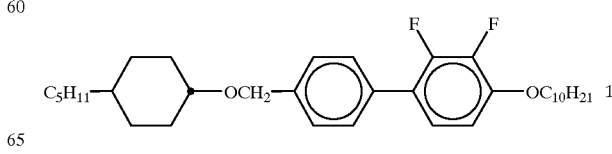

-continued

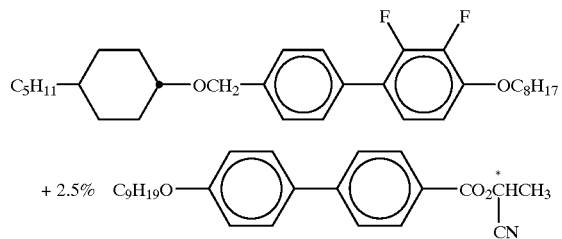

$V_{min}=40$ $t_{min}=33$ Ps=6.4 nCcm$^{-2}$. (36° C.)

031291-1 is a mixture of the following:

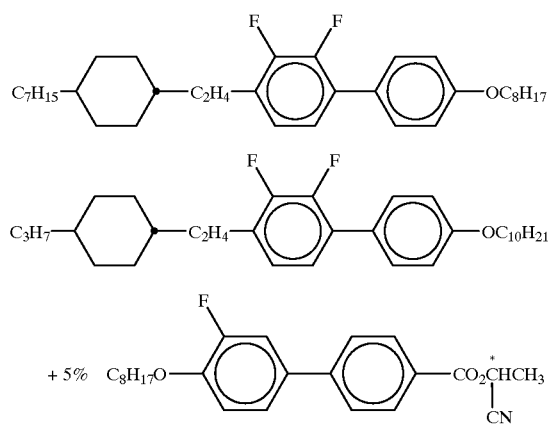

$V_{min}=38$ $t_{min}=35$ Ps=6.5 nCcm$^{-2}$. (25° C.)

H1 is a mixture of the following:

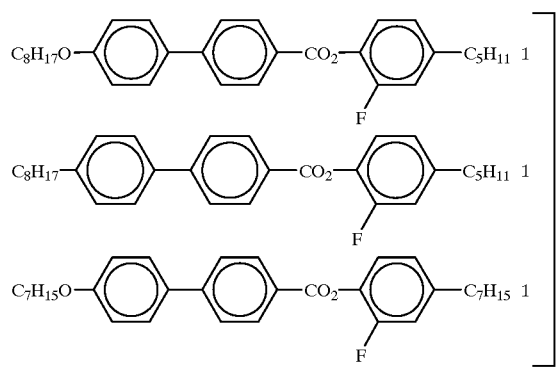

plus 1.75% of BE80F2N $V_{min}=35$ $t_{min}=90$ Ps=9.0 nCcm$^{-2}$.

VH50 is a mixture of the following:

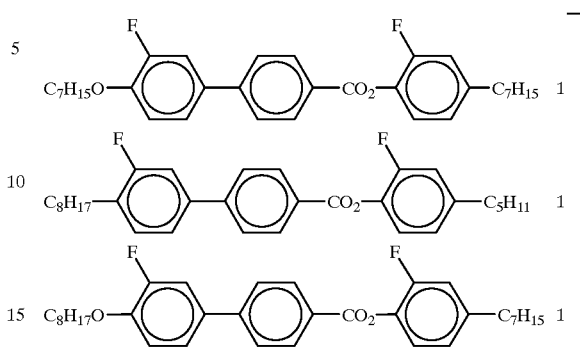

plus 10% of BE80F2N (1.71% active)
$V_{min}=35$ $t_{min}=163$ Ps=7.4 nCcm$^{-2}$.

VF9 is a mixture of the following:

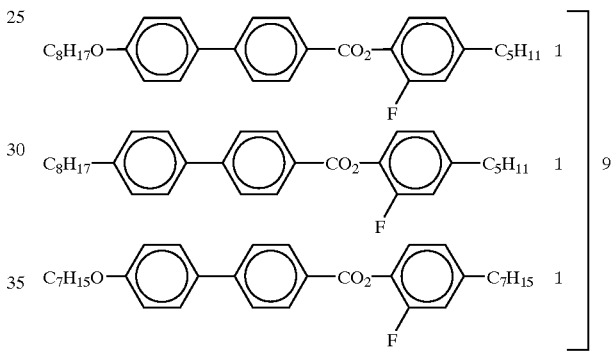

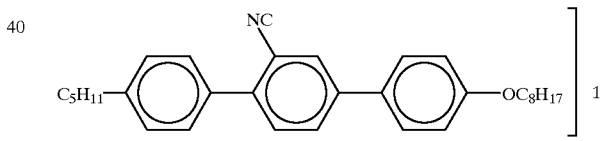

plus 2% of BE80F2N
$V_{min}=61$ $t_{min}=41$ Ps=9.2 nCcm$^{-2}$.
BDH 835 is a commercially available mixture from Merck
$V_{min}=45$ $t_{min}=33$ Ps=9.5 nCcm$^{-2}$.
SCE8 is a commercially available mixture from Merck
$V_{min}=50$ $t_{min}=46$ Ps=5.7 nCcm$^{-2}$ (25° C.).
LT4 is a mixture of the following:

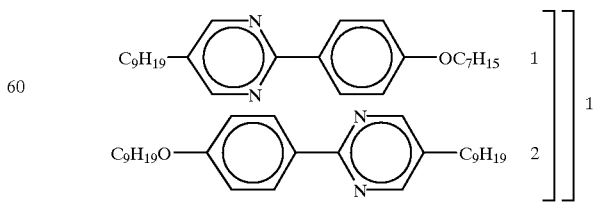

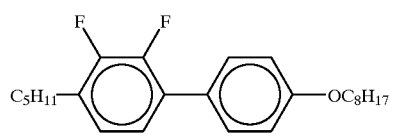

plus 2% of BE80F2N $V_{min}=52$ $t_{min}=26$ Ps=6.6 nCcm$^{-2}$ (0° C.).

VH51 is a mixture of the following:

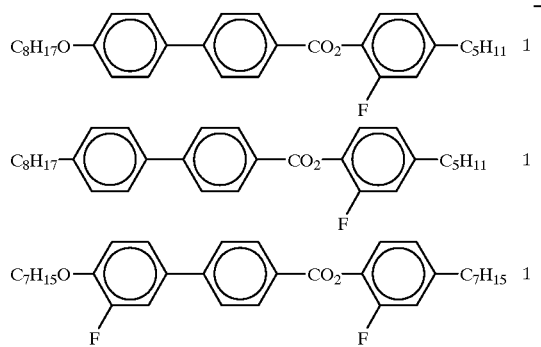

plus 10% of BE80F2N (1.75% active)

$V_{min}=30$ $t_{min}=66$ Ps=7.1 nCcm$^{-2}$.

VH52 is a mixture of the following:

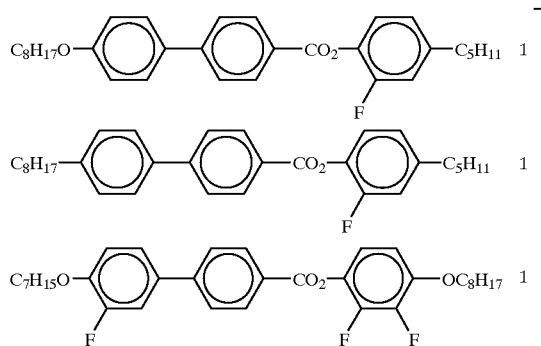

plus 10% of BE80F2N (1.7% active)

$V_{min}=35$ $t_{min}=121$ Ps=5.7 nCcm$^{-2}$.

AS452 is a mixture of the following:

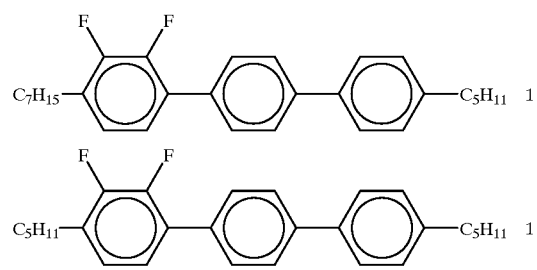

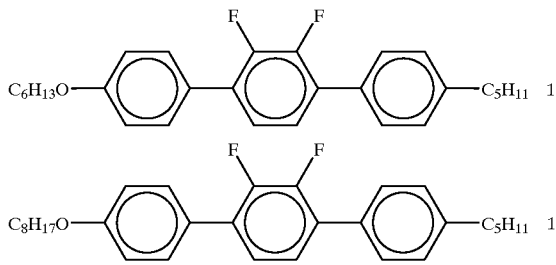

plus 1.75% of BE80F2N $V_{min}=41$ $t_{min}=13$

AS407 is a mixture of the following:

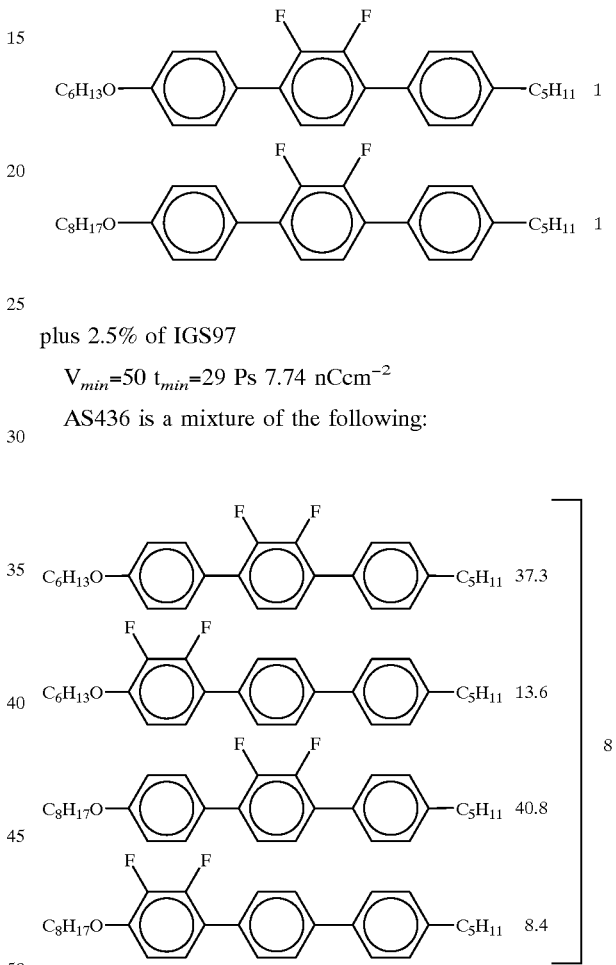

plus 2.5% of IGS97

$V_{min}=50$ $t_{min}=29$ Ps 7.74 nCcm$^{-2}$

AS436 is a mixture of the following:

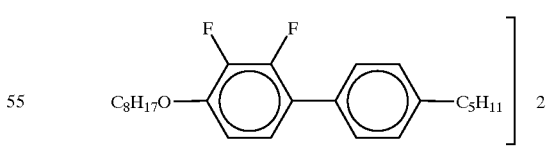

plus 2.5% of IGS97

$V_{min}=50$ $t_{min}=17$ Ps=6.6 nCcm$^{-2}$

AS435 is the same as AS436 except that there is 1.28% of IGS97 present.

$V_{min}=45$ $t_{min}=31$ Ps=2.7 nCcm$^{-2}$ wherein:

IGS97 is:

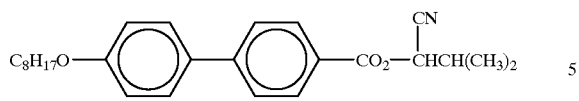

BE80F2N

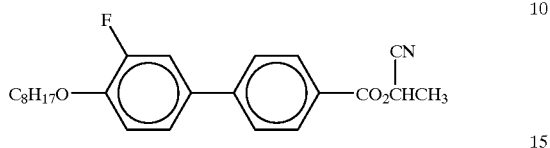

What is claimed is:

1. A ferroelectric liquid crystal device comprising two spaced cell walls each bearing electrode structures and treated on at least one facing surface with an alignment layer, a layer of a smectic liquid crystal material enclosed between the cell walls, a minimum in its response time versus voltage curve, wherein crystal material consists of two components; A and B, where the two components are given by:

Component A present in a range of 0.1–50 wt % is one or more optically active compounds capable of imparting a spontaneous polarization to the material and is given by the following general formula:

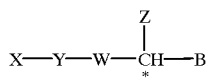

in which X is a group having a general structure:

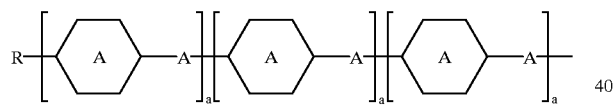

and B is alkyl containing 1–12 carbons, a chiral group, or a group having a general structure

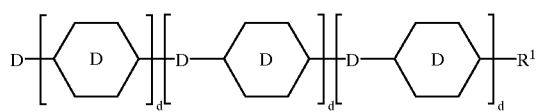

where R and $R^1$ are independently hydrogen or $C_{1-12}$ alkyl, alkoxy, alkylcarbonyloxy or alkoxycarbonyl, each of the rings (A) and (D) may be the same or different and are each independently selected from optionally alkyl-, cyano- or halogen- substituted phenyl, transcyclohexyl, pyridyl, pyrimidyl, bicyclo (2,2,2) octyl or dioxan each A and D may be the same or different and is independently selected from a single bond, COO, OOC, CH=N, N=CH, $CH_2O$, $OCH_2$, $CH_2$, $CH_2CH_2$, $CH(CH_3)$ or a combination of two of such groups in which each a and d is independently 0 and 1,
in which Y is selected from —COO—, —OOC—, —O— or a single bond, in which W is selected from a single bond, —(—$CH_2$—)—$_n$ or —$(CH_2)_m CH(Z^1)$— —$(CH_2)_p$— where n, m and p are independently 0 to 10;

in which Z or $Z^1$ are independently selected from CN, Cl, F, Br and $CF_3$; provided that when Z is Cl or CN, then when B is alkyl, X—Y— is not

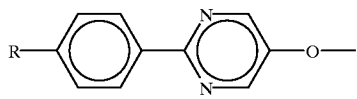

or

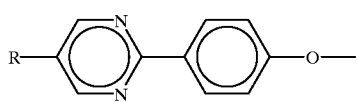

Component B is present in an amount sufficient to enable A+B=100 wt %, wherein Component B is at least two compounds selected from:

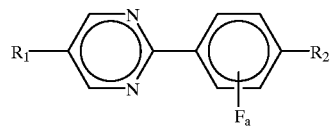

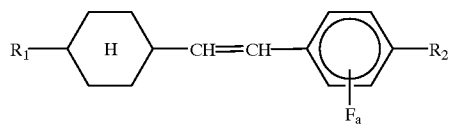

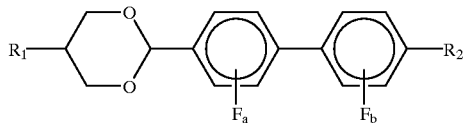

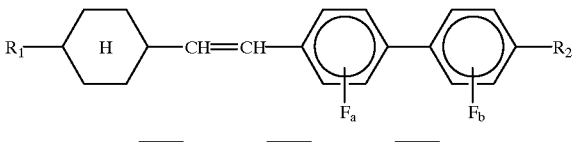

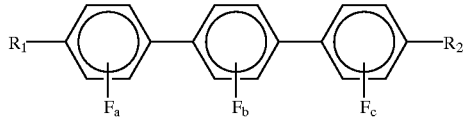

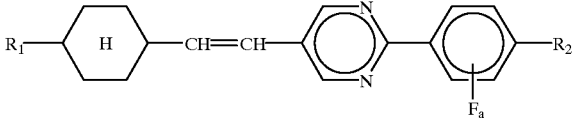

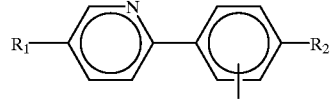

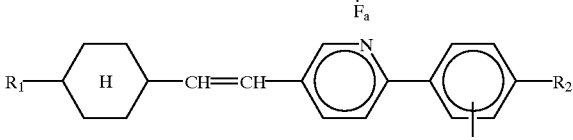

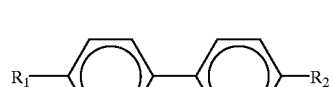

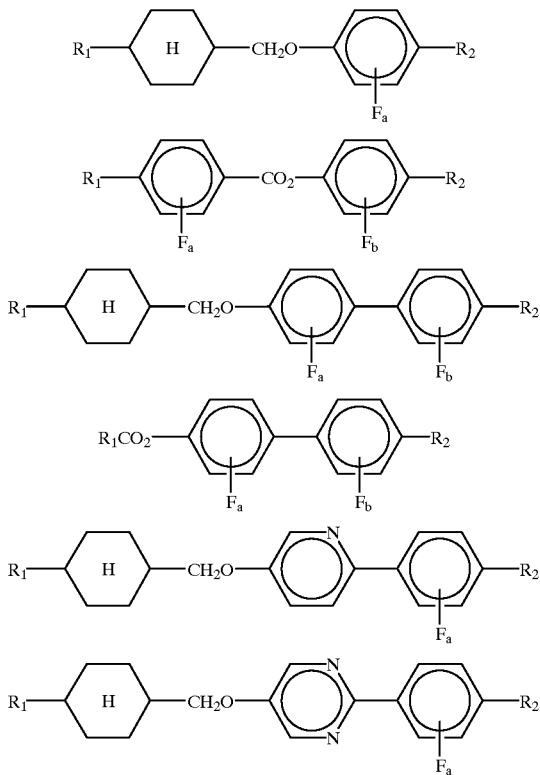

wherein a, b and c are independently 0, 1 or 2 and $R_1$ and $R_2$ are $C_{1-15}$ straight or branched chain alkyl or alkoxy provided that in component B the CH=CH linking groups may be replaced by $C_2H_4$ and $CH_2O$ linking groups may be replaced by $OCH_2$.

2. A device according to claim 1 wherein $R_1$ and $R_2$ are $C_3$–$C_{12}$.

3. A device according to claim 1 wherein one of the compounds constituting component B consists of one or more compounds selected from:

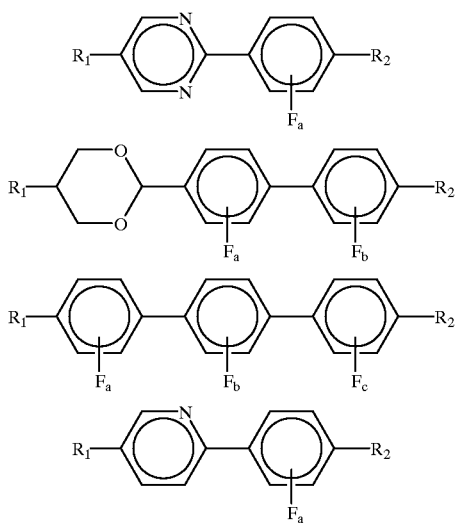

4. A device according to claim 1 wherein component A is given by the following general formula:

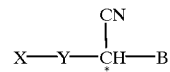

in which X is a group having a general structure:

where R is selected from hydrogen or $C_{1-12}$ alkyl or alkoxy, each of the rings

is the same or different and is each independently selected from phenyl, halogen-substituted phenyl or trans cyclohexyl, A is selected from a single bond, COO or OOC, a is 0 or 1, Y is selected from COO or O, and B is alkyl containing 1–12 carbon atoms, cyclohexyl or a group

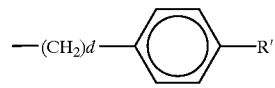

where d is 0 or 1 and R' is selected from hydrogen or $C_{1-12}$ alkyl or alkoxy.

5. A device according to claim 1 wherein one or more of the compounds constituting component A is present in the range 1–15 wt %.

6. A device according to claims 3 wherein one or more of the compounds constituting component A is present in the range 1–15 wt %.

7. A device according to claim 1 wherein one or more of the compounds constituting component B is present in the range 5–60 wt %.

8. A device according to claim 3 wherein one or more of the compounds constituting component A is present in the range 10–30 wt %.

9. A device according to claim 1 wherein the ferroelectric liquid crystal device is multiplex addressed.

10. A device according to claim 1 wherein component A when added to component B gives rise to a tilted chiral smectic liquid crystal material having a cholesteric pitch which is greater than half the layer thickness d over a temperature range of at least 0.1° C. above a cholesteric to smectic transition temperature and a spontaneous polarisation Ps in the chiral smectic phase.

11. A device according to claim 10 wherein component A consists of (+) and (−) chiral materials such that the resultant mixture has a spontaneous polarisation in the chiral tilted smectic phases.

* * * * *